United States Patent
Kubota et al.

(10) Patent No.: US 10,635,522 B2
(45) Date of Patent: Apr. 28, 2020

(54) PROCESSOR-FAULT REPRODUCTION METHOD, INFORMATION PROCESSING APPARATUS, AND RECORDING MEDIUM RECORDING EXECUTION-TIME REPORTING PROGRAM

(71) Applicant: FUJITSU LIMITED, Kawasaki-shi, Kanagawa (JP)

(72) Inventors: Jumpei Kubota, Yokohama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 15/963,180

(22) Filed: Apr. 26, 2018

(65) Prior Publication Data
US 2018/0321999 A1    Nov. 8, 2018

(30) Foreign Application Priority Data
May 8, 2017    (JP) .................. 2017-092206

(51) Int. Cl.
*G06F 11/00*    (2006.01)
*G06F 11/07*    (2006.01)
(Continued)

(52) U.S. Cl.
CPC ............ *G06F 11/079* (2013.01); *G01K 3/005* (2013.01); *G01K 3/10* (2013.01); *G01K 13/00* (2013.01);
(Continued)

(58) Field of Classification Search
CPC ............ G06F 11/0721; G06F 11/0751; G06F 11/0769; G06F 11/079; G06F 11/2236;
(Continued)

(56) References Cited

U.S. PATENT DOCUMENTS 8,464,143 B2 *  6/2013 Olson ................. G06F 11/24
                                            714/799
10,303,574 B1 *  5/2019 Aalund ................ G06F 1/206
(Continued)

FOREIGN PATENT DOCUMENTS

JP        63-75844      4/1988
JP        4-175834      6/1992
JP        2009-217770   9/2009

OTHER PUBLICATIONS

Aghaee, Nima et al., Efficient Test Application for Rapid Multi-Temperature Testing, May 2015, ACM (Year: 2015).*
(Continued)

*Primary Examiner* — Marc Duncan
(74) *Attorney, Agent, or Firm* — Fujitsu Patent Center

(57) ABSTRACT

A processor-fault reproduction method includes: determining a heating time of a processor taken using a heating program which heats the processor to a fault occurrence temperature when a fault occurs from a current temperature based on first information regarding the current temperature of the processor, second information regarding a power consumption value and a temperature of the processor before the fault occurs and a refrigerant temperature of a cooling medium to cool the processor, third information regarding the fault occurrence temperature, and fourth information regarding a power consumption value of the processor during execution of the heating program; determining an execution time by adding a fault reproduction time taken by a fault reproducing program which reproduces a state of the processor when the fault occurs to the heating time; and reporting the execution time to a job scheduler with a request to execute the heating and fault reproducing programs.

15 Claims, 9 Drawing Sheets

US 10,635,522 B2

Page 2

(51) Int. Cl.
    *G01K 13/00*     (2006.01)
    *G01K 3/10*     (2006.01)
    *G01K 3/00*     (2006.01)

(52) U.S. Cl.
    CPC ...... *G06F 11/0721* (2013.01); *G06F 11/0751* (2013.01); *G06F 11/0769* (2013.01)

(58) Field of Classification Search
    CPC .... G06F 11/263; G06F 9/4843; G06F 9/4881; G06F 11/3688; G01K 3/005; G01K 3/10; G01K 13/00; G01R 31/003; G01R 31/2642; G01R 31/2817; G01R 31/2836; G01R 31/2849; G01R 31/2875
    See application file for complete search history.

(56) References Cited

U.S. PATENT DOCUMENTS

2011/0314335 A1*  12/2011  Tanaka .................. G06F 11/263
                                                            714/33
2019/0079849 A1*  3/2019  Korn ...................... G06Q 10/04

OTHER PUBLICATIONS

He, Zhiyuan, Temperature Aware and Defect-Probability Driven test Scheduling for System-on-Chip, 2010, Linkoping University (Year: 2010).*

* cited by examiner

FIG. 5

| ITEM NO. | STATE | CPU TEMPERATURE [°C] | POWER [W] CONSUMED BY CPU | REFRIGERANT TEMPERATURE [°C] |
|---|---|---|---|---|
| 1 | CONSUMPTION 0 | 20 | 0 | 20 |
| 2 | STEADY | 30 | 20 | 20 |
| 3 | STEADY | 30 | 20 | 20 |
| 4 | STEADY | 30 | 20 | 20 |
| 5 | TRANSIENT | 30 | 100 | 20 |
| 6 | TRANSIENT | 55 | 100 | 20 |
| 7 | TRANSIENT | 65 | 100 | 20 |
| 8 | TRANSIENT | 68 | 100 | 20 |
| 9 | FAULT | 45 | 80 | 20 |

PROCESSOR-FAULT REPRODUCTION METHOD, INFORMATION PROCESSING APPARATUS, AND RECORDING MEDIUM RECORDING EXECUTION-TIME REPORTING PROGRAM

CROSS-REFERENCE TO RELATED APPLICATION

This application is based upon and claims the benefit of priority of the prior Japanese Patent Application No. 2017-092206, filed on May 8, 2017, the entire contents of which are incorporated herein by reference.

FIELD

The embodiment discussed herein is related to a processor-fault reproduction method, an information processing apparatus, and a recording medium recording an execution-time reporting program.

BACKGROUND

With widespread use of information and communication technology, faulty portions in information systems are diagnosed, and maintenance such as monitoring the information system is performed.

Related technologies are disclosed in Japanese Laid-open Patent Publication No. 2009-217770, Japanese Laid-open Patent Publication No. 4-175834, or Japanese Laid-open Patent Publication No. 63-75844.

SUMMARY

According to an aspect of the embodiments, a processor-fault reproduction method includes: determining, by a computer, a heating time of a processor which is taken using a heating program which heats the processor to a fault occurrence temperature when a fault occurs from a current temperature based on first information regarding the current temperature of the processor, second information regarding a power consumption value and a temperature of the processor before the fault occurs and a refrigerant temperature of a cooling medium to cool the processor, third information regarding the fault occurrence temperature, and fourth information regarding a power consumption value of the processor during execution of the heating program; determining an execution time by adding a fault reproduction time taken by a fault reproducing program which reproduces a state of the processor when the fault occurs to the heating time; and reporting the execution time to a job scheduler in conjunction with a request to execute the heating program and the fault reproducing program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a format of a temperature environment file;

DESCRIPTION OF EMBODIMENT

Figure 1:
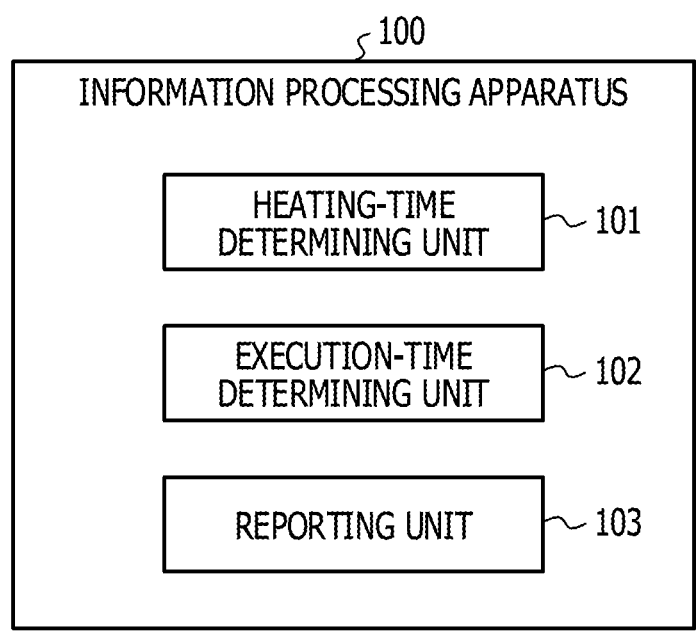
FIG. 1 illustrates an example of an information processing apparatus.

For example, a failure predicting and reporting system includes a maintenance management server that predicts a failure in an apparatus, based on an apparatus operating state periodically transmitted through a network at predetermined intervals, and that reports the predicted failure to a user who uses the apparatus. The maintenance management server includes a maintenance management database in which attribute information of the apparatus is registered in advance. The maintenance management server predicts occurrence of a failure in the apparatus, based on information regarding the apparatus operating state transmitted from a monitoring terminal and the attribute information of the apparatus which is registered in the maintenance management database. The maintenance management server reports, through a network, the predicted failure occurrence prediction information to a user terminal of the user who uses the apparatus.

Thus, work for maintaining the apparatus and work for replacing components included in an apparatus are efficiently performed to obviate an outage due to a failure in the apparatus.

For example, a program fault automatic diagnosis apparatus immediately recognizes cause information and solution information for abnormal termination at the time of abnormal termination of a program. Thus, the time taken until a solution is implemented is reduced, and an influence on the system that is running is reduced. Also, a cause is accurately analyzed and an optimum solution is easily determined, without depending on program experience.

For example, in a method for checking fault fixing, when an apparatus abnormality occurs in apparatuses in a main-unit system, a peripheral system, and a circuit system in an electronic computer, test data is automatically generated using log data while the abnormality is fixed with reference to the log data, and the apparatus is tested using the test data to thereby check the fault fixing.

For example, a fault in a central processing unit (CPU) is reproduced by a method described below.

When a fault occurs, register contents, a sequence of execution instructions issued from the CPU immediately before the fault occurred, and a CPU temperature are recorded. A fault reproducing program is created based on the recorded register contents and the recorded sequence of execution instructions issued immediately before the fault occurred. The fault reproducing program is a program for reproducing a fault in a CPU by reproducing, based on register contents and a sequence of execution instructions issued before the fault occurred, the register contents when the fault occurred, and issuing the sequence of execution instructions issued before the fault occurred. A heating program is used in order to reproduce the CPU temperature when the fault occurred. The heating program applies large load to the CPU to heat the processor. For example, power W consumed by loop-execution of the heating program on the CPU has already been measured, and the heating program causes the CPU temperature to reach a target CPU temperature. Causing the heating program to reproduce a CPU temperature when a fault occurred and executing the fault reproducing program is referred to as a "reproduction test".

In a parallel computing apparatus, a scheduled time during which nodes (computing apparatuses included in the parallel computing apparatus) is applied to a job scheduler, and a job submission reservation is made. For example, in order to execute a reproduction test, a node occupancy time in the reproduction test is applied for.

In order to reproduce a fault caused by a CPU temperature in a parallel computing apparatus, a fault reproducing program is executed after a heating program is used to heat the CPU to a fault occurrence temperature at which the fault occurred.

For example, it is important that, depending on a situation when a job submission reservation is made, a time taken for the CPU temperature to reach a temperature indicated by a CPU fault occurrence condition when the heating program is executed is estimated with sufficient accuracy.

However, since the time taken for the heating program to heat the CPU to the fault occurrence temperature is not known, there is a case in which the execution time of the reproduction test is not reported to the job scheduler.

Since transition of the CPU temperature when the heating program execution is executed depends on not only the type of CPU but also thermodynamic properties that are unique to equipment in a reproduction environment and an installed computer model, it is difficult to easily estimate the transition of the CPU temperature. Also, a method for measuring a time taken from when the heating program is actually executed until the temperature of the CPU reaches a predetermined temperature may not be employed, since it is difficult to pre-estimate the execution time (the upper limit) with sufficient accuracy.

For example, a technology may be provided with which the execution time of a reproduction test job for reproducing the state of a processor during a fault is reported to a job scheduler.

FIG. 1 illustrates an example of an information processing apparatus. An information processing apparatus 100 includes a heating-time determining unit 101, an execution-time determining unit 102, and a reporting unit 103. Based on first information, second information, third information, and fourth information, the heating-time determining unit 101 determines a heating time that the heating program takes to cause a processor to reach a fault occurrence temperature from a present temperature. The first information is information regarding the present temperature of a processor. The second information is information regarding a power consumption value and a temperature of the processor when the heating program for heating the processor is executed and a refrigerant temperature of a cooling medium for cooling the processor. The third information is information regarding a fault occurrence temperature that is a temperature when a fault occurred. The fourth information is information regarding a power consumption value of the processor during execution of the heating program. An example of the heating-time determining unit 101 is a heating-time estimating unit 14.

The execution-time determining unit 102 determines an execution time obtained by adding a fault reproduction time taken by a fault reproducing program for reproducing the state of the processor when the fault occurred to the heating time. An example of the execution-time determining unit 102 is a reproduction-test submission unit 17.

The reporting unit 103 reports the execution time to a job scheduler in conjunction with a request for executing the heating program and the fault reproducing program. An example of the reporting unit 103 is the reproduction-test submission unit 17.

With such a configuration, the execution time of a reproduction test job for reproducing a state during a fault in the processor is reported to the job scheduler.

The heating-time determining unit 101 determines a first cooling capability of the processor when the processor is in a steady state, in accordance with, of the second information, the power consumption value of the processor, the temperature of the processor, and the refrigerant temperature when the power consumption value of the processor and the refrigerant temperature do not change and the temperature of the processor does not change. The heating-time determining unit 101 determines a second cooling capability of the processor when the processor is in a transient state, in accordance with, of the second information, the power consumption value of the processor, the temperature of the processor, and the refrigerant temperature when the power consumption value of the processor or the refrigerant temperature changes and the temperature of the processor also changes.

Based on the first information, the fourth information, the first cooling information, and the second cooling information, the heating-time determining unit 101 cumulatively adds increased temperatures of the processor relative to the present temperature of the processor at predetermined time intervals. When a temperature resulting from the cumulative addition reaches the fault occurrence temperature, the heating-time determining unit 101 determines the heating time, based on the predetermined time intervals and the number of cumulatively added temperatures.

With such a configuration, the heating time taken by the heating program is estimated with sufficient accuracy.

Figure 2:
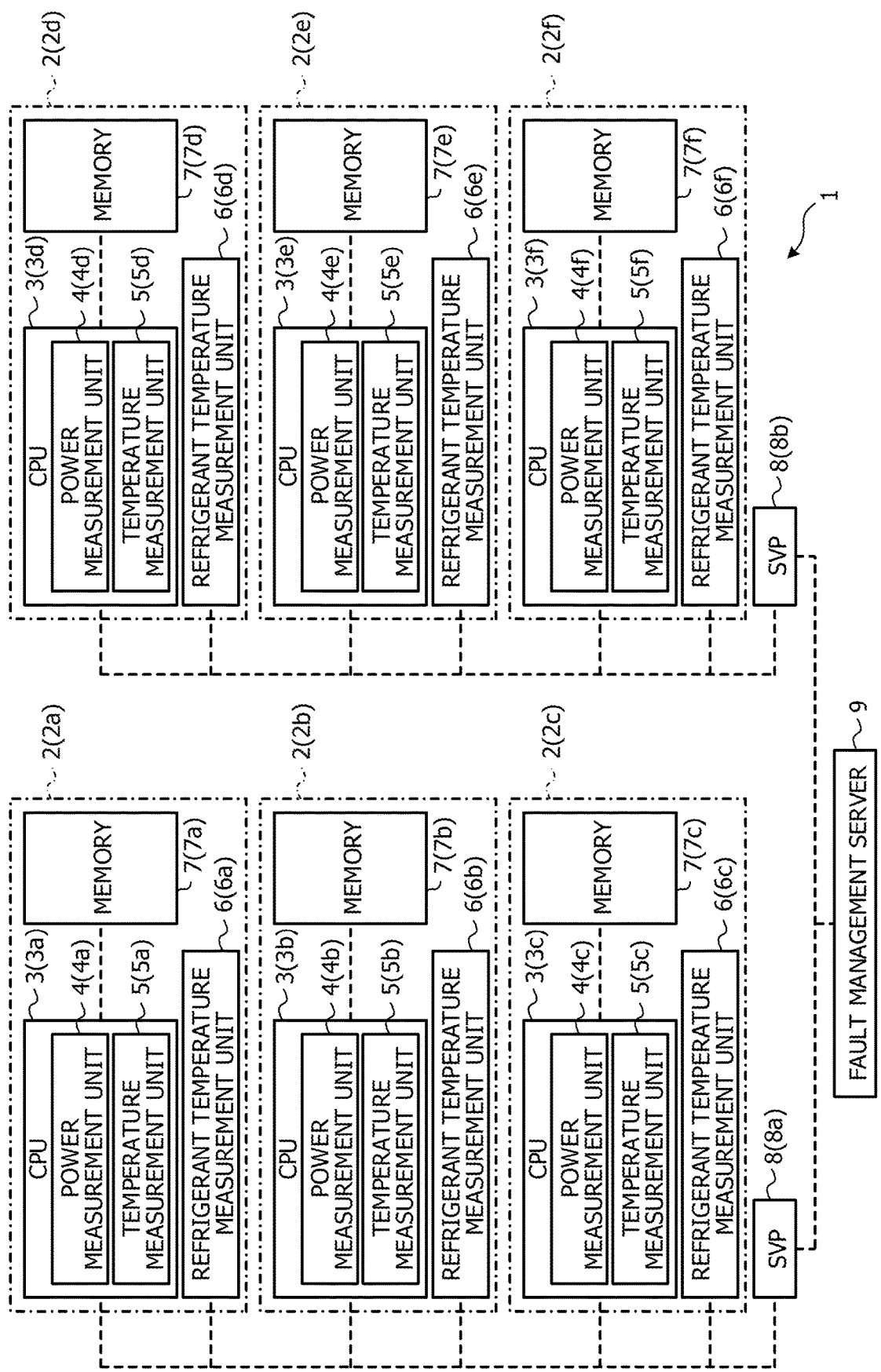
FIG. 2 illustrates an example of a hardware configuration of a parallel computing apparatus.

FIG. 2 illustrates an example of a hardware configuration of a parallel computing apparatus. A parallel computing apparatus 1 includes a plurality of computing apparatuses (nodes) 2, a plurality of service processors (SVPs) 8, and a fault management server 9. In FIG. 2, nodes 2a, 2b, 2c, 2d, 2e, and 2f are illustrated as the nodes 2. Configurations and functions regarding the nodes 2a, 2b, 2c, 2d, 2e, and 2f are given corresponding suffixes (a, b, c, d, e, and f).

The nodes 2 (2a, 2b, 2c, 2d, 2e, and 2f) include CPUs 3 (3a, 3b, 3c, 3d, 3e, and 3f), refrigerant-temperature measurement units 6 (6a, 6b, 6c, 6d, 6e, and 6f), and memories 7 (7a, 7b, 7c, 7d, 7e, and 7f), respectively.

Each CPU 3 reads and executes a program, performs processing based on the executed program, and controls the corresponding entire node 2. Each memory 7 is a storage device for temporarily holding a program executed by the corresponding CPU 3 and data processed thereby.

The CPUs 3 (3a, 3b, 3c, 3d, 3e, and 3f) include power measurement units 4 (4a, 4b, 4c, 4d, 4e, and 4f) and temperature measurement units 5 (5a, 5b, 5c, 5d, 5e, and 5f), respectively. Although, in the present embodiment, the power measurement units 4 and the temperature measurement units 5 are built into the corresponding CPUs 3, they may be provided outside the CPUs 3.

Each power measurement unit 4 measures the power consumption value of the corresponding CPU 3. When the power measurement unit 4 is included in the CPU 3, the power measurement unit 4 records a measured power consumption value. When the power measurement unit 4 is not included in the CPU 3, a monitoring program, which is firmware of the corresponding SVP 8, may record a measured value of power consumed by the CPU 3.

Each temperature measurement unit 5 measures the temperature of the corresponding CPU 3. When the temperature measurement unit 5 is included in the CPU 3, temperature measurement processing is added to error interrupt processing in hardware when a fault occurs. When the temperature measurement unit 5 is not included in the CPU 3, a temperature sensor for the CPU 3 may be used. In this case, by using the temperature sensor, a monitoring program, which is firmware of the SVP 8, measures a CPU temperature when a fault occurs.

Each refrigerant-temperature measurement unit 6 measures the temperature of a refrigerant for cooling the corresponding CPU 3 heated by calculation processing. When the refrigerant-temperature measurement unit 6 is included in the CPU 3, the refrigerant-temperature measurement unit 6 records a measured refrigerant temperature. When the refrigerant-temperature measurement unit 6 is not included in the CPU 3, a monitoring program, which is firmware of the SVP 8, records the measurement value of the refrigerant temperature for the CPU 3.

In a measurement-value collection job 12, the power measurement unit 4, the temperature measurement unit 5, and the refrigerant-temperature measurement unit 6 record the CPU temperature, the power consumed by the CPU 3, and the refrigerant temperature to a temperature environment file. Upon being triggered by an interrupt during a fault, the power measurement unit 4, the temperature measurement unit 5, and the refrigerant-temperature measurement unit 6 record the CPU temperature, the power consumed by the CPU 3, and the refrigerant temperature to the temperature environment file by using a fault-time collection program 13 described below.

The SVPs 8 (8*a* and 8*b*) report control commands to the CPUs 3 and receive instructions and measurement information from the nodes 2. The SVPs 8 (8*a* and 8*b*) are connected to the CPUs 3 and the refrigerant-temperature measurement units 6 in the nodes 2. In FIG. 2, the SVP 8*a* is connected to the CPUs 3*a* to 3*c* and the refrigerant-temperature measurement units 6*a* to 6*c* in the nodes 2*a* to 2*c*. The SVP 8*b* is connected to the CPUs 3*d* to 3*f* and the refrigerant-temperature measurement unit 6*d* to 6*f* in the nodes 2*d* to 2*f*.

The fault management server 9 manages faults in the hardware in the parallel computing apparatus 1. The fault management server 9 is connected to the SVPs 8 (8*a* and 8*b*) to manage fault data regarding hardware, the fault data being received from the SVPs 8.

Figure 3:
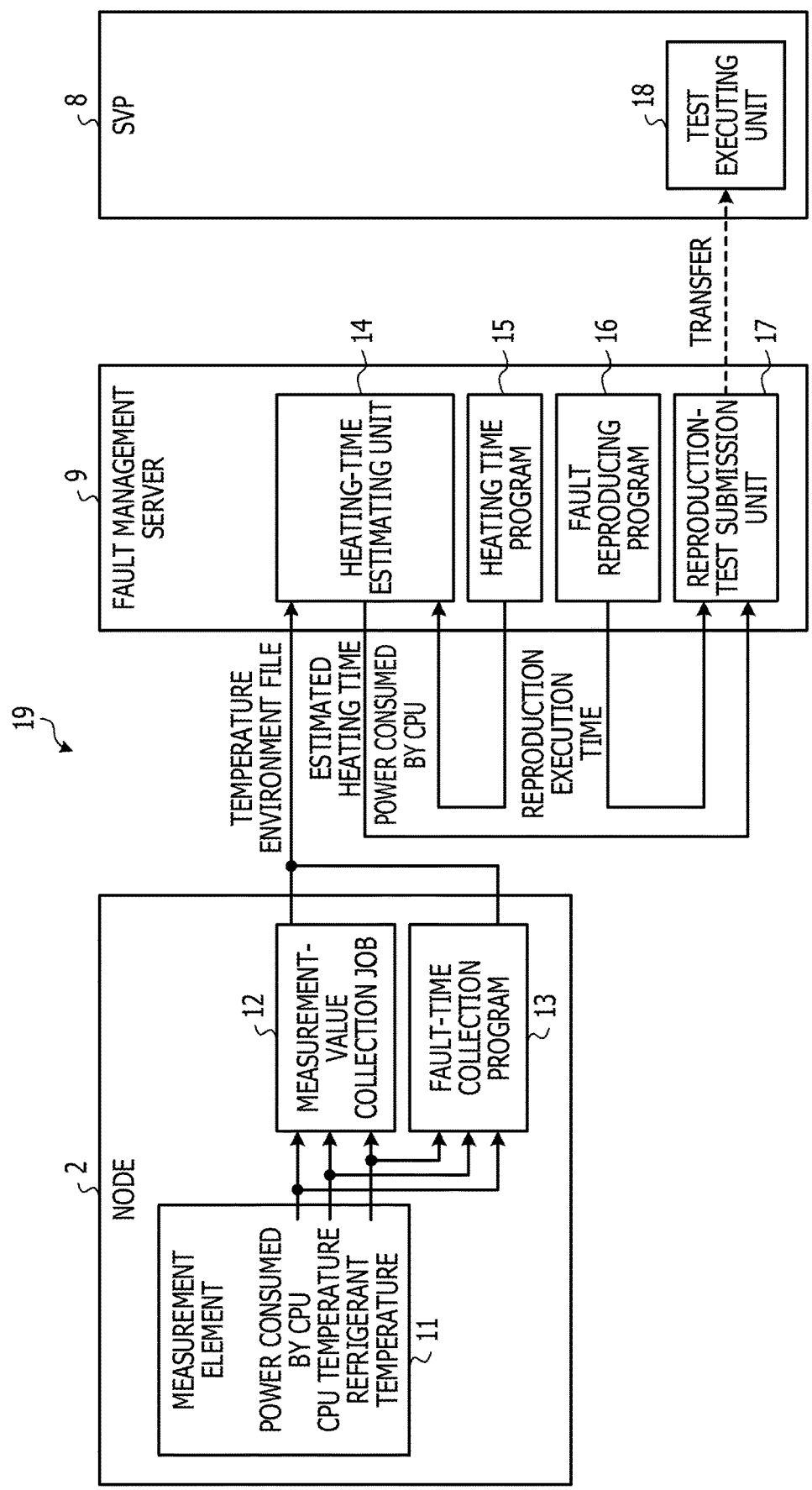
FIG. 3 illustrates an example of programs and functions that operate in a parallel computing apparatus.

FIG. 3 illustrates an example of programs and functions that operate in the parallel computing apparatus. Each node 2 includes a measurement element 11, a measurement-value collection job 12, and a fault-time collection program 13. The measurement element 11 is a collective term of the power measurement unit 4, the temperature measurement unit 5, and the refrigerant-temperature measurement unit 6.

When the measurement element 11 is the power measurement unit 4, the power measurement unit 4 transmits the power consumed by the CPU 3 to the measurement-value collection job 12 or the fault-time collection program 13. When the measurement element 11 is the temperature measurement unit 5, the temperature measurement unit 5 transmits the temperature of the CPU 3 (the CPU temperature) to the measurement-value collection job 12 or the fault-time collection program 13. When the measurement element 11 is the refrigerant-temperature measurement unit 6, the refrigerant-temperature measurement unit 6 transmits the refrigerant temperature of the CPU 3 to the measurement-value collection job 12 or the fault-time collection program 13.

The measurement-value collection job 12 is a job that operates by being executed by the CPU 3 that is in an unoccupied time and on which no processing is performed. The measurement-value collection job 12 includes the heating program. This heating program is transferred from the fault management server 9 and is stored in a memory (not illustrated) in the node 2. The heating program is a program for applying large load to the CPU 3 to heat the processor. The measurement-value collection job 12 causes the CPU 3 to run the heating program, generates a temperature environment file 19 based on thermodynamic property data (the power consumed by the CPU 3, the CPU temperature, and the refrigerant temperature) received from the measurement element 11 that measures various types of measurement data of the CPU 3, and outputs the temperature environment file 19.

The fault-time collection program 13 is a program that is executed by the CPU 3 when a fault occurs. Based on the thermodynamic property data (the power consumed by the CPU 3, the CPU temperature, and the refrigerant temperature) received from the measurement element 11, the CPU temperature, the power consumed by the CPU, and the refrigerant temperature when a fault occurs are recorded to the temperature environment file 19. The fault-time collection program 13 collects pieces of information after a fault occurs.

The fault management server 9 includes the heating-time estimating unit 14, a heating program 15, a fault reproducing program 16, and the reproduction-test submission unit 17. The heating program 15 and the fault reproducing program 16 are pre-included in the fault management server 9.

By using, as input information, the temperature environment file 19 received from the CPU 3 and the power W consumed in the heating program, the heating-time estimating unit 14 determines, as a heating time (an estimated value), a time taken for the CPU temperature to reach a temperature that is the same as the temperature when a failure occurred. For reproducing a fault, the heating time is used as a time (an estimated value) taken for the CPU temperature to reach the CPU temperature when the fault occurred. While the CPU 3 produces heat when it operates, the CPU 3 releases heat since it is cooled by liquid-cooling. When the temperature of the CPU 3 increases, and the difference between the CPU temperature and the temperature of the refrigerant for liquid-cooling increases, the amount of heat released from the CPU 3 owing to the liquid-cooling increases. Thus, under an environment where the amount of heat produced does not change, the CPU temperature eventually converges to a CPU temperature at which the amount of heat produced by the CPU 3 and the amount of heat released owing to liquid-cooling match each other.

The heating program 15 is a program for heating a processor by applying large load to the CPU 3, and is used to reproduce a CPU temperature when a fault occurred. The heating program 15 causes the temperature of the CPU 3 to reach an intended CPU temperature. The power consumption value (the power W to be consumed), which is the value of power consumed by the CPU 3 when the heating program 15 is executed by the CPU 3, is pre-set for the heating program 15.

The fault reproducing program 16 is a program for reproducing a state when a fault occurred, the program being created based on the recorded register contents and the recorded sequence of execution commands issued immediately before the fault occurred.

The reproduction-test submission unit 17 determines the execution time (=t1+t2) of the fault reproduction test, based on the heating time (an estimated heating time) t1 determined by the heating-time estimating unit 14 and a reproduction execution time t2 of the fault reproducing program 16. The reproduction-test submission unit 17 reserves the determined execution time of the fault reproduction test with the job scheduler. The job scheduler runs, for example, on the fault management server 9 or on a server in the parallel computing apparatus 1. The job scheduler manages jobs in the nodes 2 in the parallel computing apparatus 1 and also manages the nodes 2 that are unoccupied.

The reproduction-test submission unit 17 generates a fault-reproduction checking program by packaging the heating program that runs on the CPU 3 with the power W consumed for the heating time t1 and the fault reproducing program that runs for the reproduction execution time t2, and transfers the generated fault-reproduction checking program to the SVP 8 or the node 2.

The SVP 8 includes a test executing unit 18. Based on an execution instruction from the job scheduler, the test executing unit 18 launches the fault-reproduction checking program on the SVP 8 and controls execution of the fault reproduction test in the node 2 to be tested.

Figure 4:
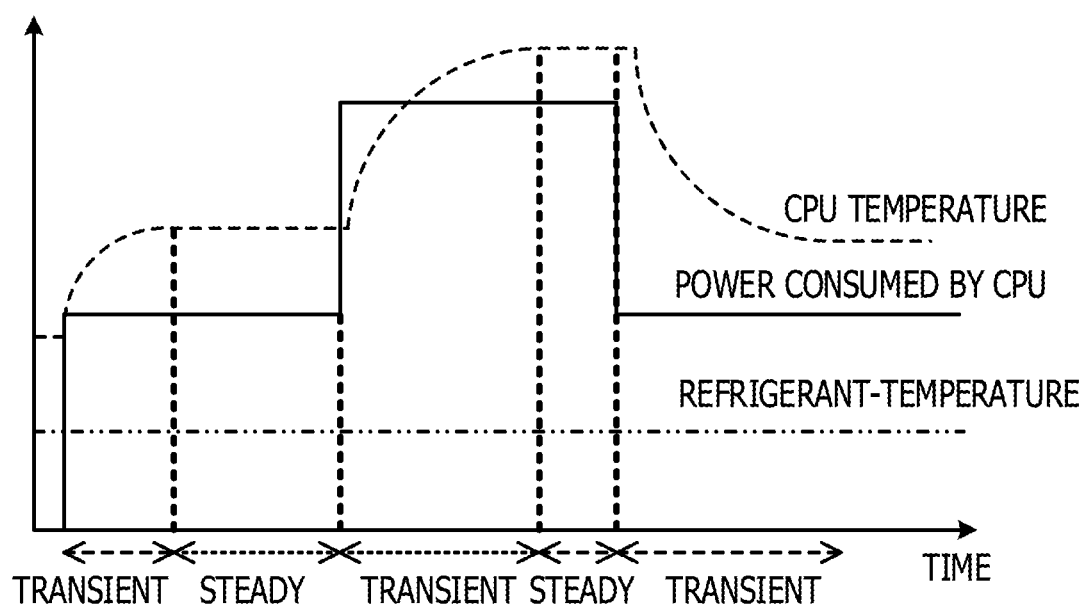
FIG. 4 illustrates an example of changes in measurement values due to a measurement-value collection job.

FIG. 4 illustrates an example of changes in the measurement values obtained by the measurement-value collection job. In FIG. 4, the power consumed by the CPU 3 is indicated by a solid line. The CPU temperature is indicated by a dashed line. The refrigerant temperature is indicated by a long dashed double-short dashed line.

The power consumed by the CPU 3, the CPU temperature, and the refrigerant temperature obtained by the measurement-value collection job 12 change, for example, as illustrated in FIG. 4. In FIG. 4, the horizontal axis is a time axis, and the vertical axis represents a measurement value. The steady state and the transient state are defined as described below.

Steady state: the power consumed by the CPU and the refrigerant temperature do not change, and the CPU temperature does not change.

Transient state: the CPU temperature is changing owing to a change in the measurement value of the power consumed by the CPU or the refrigerant temperature.

The power measurement unit 4, the temperature measurement unit 5, and the refrigerant-temperature measurement unit 6 record the power consumed by the CPU 3, the CPU temperature, and the refrigerant temperature, respectively, to the temperature environment file 19.

FIG. 5 illustrates an example of the format of the temperature environment file. The steady-state measurement and the transient-state measurement when the measurement-value collection job 12 is executed and various measurement values (the power consumed by the CPU 3, the CPU temperature, and the refrigerant temperature) when a fault occurred, the measurement values being obtained by the fault-time collection program 13, are recorded in the temperature environment file 19.

The temperature environment file 19 includes items for "item number" 19-1, "state" 19-2, "CPU temperature [° C.]" 19-3, "power [W] consumed by CPU" 19-4, and "refrigerant temperature [° C.]" 19-5.

The number of a record registered in the temperature environment file 19 is recorded in the "item number" 19-1. The operation state of the CPU 3 is contained in the "state" 19-2. For example, when the power consumed by the CPU 3 is 0, "consumption 0" is recorded to the "state" 19-2. When the CPU 3 is in the steady state, "steady" is recorded to the "state" 19-2. When the CPU 3 is in the transient state, "transient" is recorded to the "state" 19-2. When a fault occurs in the CPU 3, "fault" is recorded to the "state" 19-2.

A CPU temperature is recorded to the "CPU temperature [σC]" 19-3. Power consumed by the CPU 3 is recorded to the "power [W] consumed by CPU" 19-4. A refrigerant temperature is recorded to the "refrigerant temperature [° C.]" 19-5.

Figure 6:
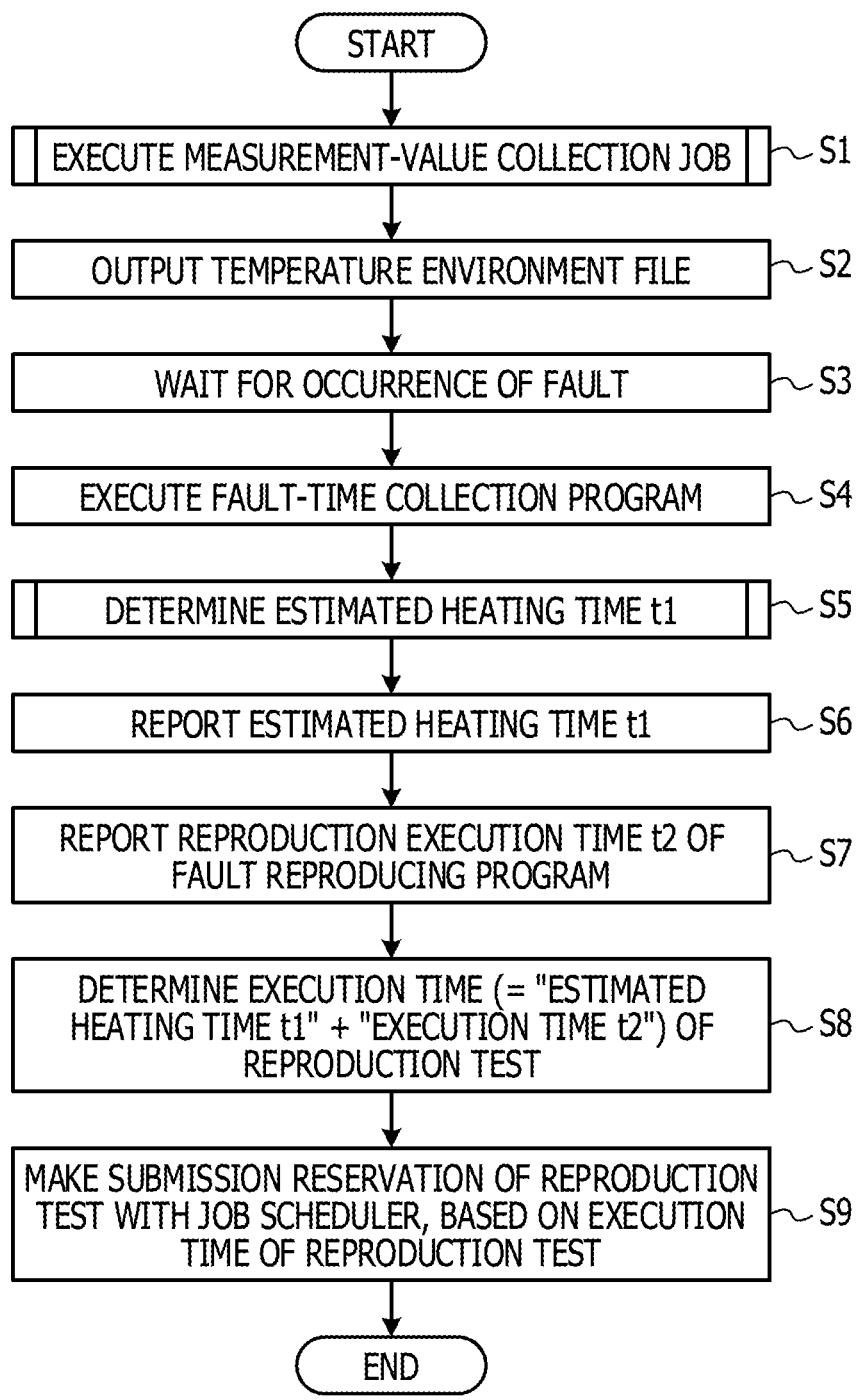
FIG. 6 illustrates an example of overall processing.

FIG. 6 is a flowchart of overall processing in the present embodiment. With respect to the node 2 that is unoccupied, the measurement-value collection job 12 is executed on the CPU 3 (S1). As a result of the execution, the measurement-value collection job 12 outputs the temperature environment file 19 to the fault management server 9 (S2).

The parallel computing apparatus 1 enters a state for waiting for occurrence of a fault (S3). When a fault occurs in the CPU 3, the CPU 3 executes the fault-time collection program 13. The executed fault-time collection program 13 records a CPU temperature, power consumed by the CPU 3, and a refrigerant temperature when the fault occurred to the temperature environment file 19 and also records "fault" to the "state" 19-2 in the recorded record (S4). The fault-time collection program 13 outputs the temperature environment file 19 to the fault management server 9 via the SVP 8.

By using, as input information, the temperature environment file 19 received from the CPU 3 and the power W to be consumed by the CPU 3 in the heating program 15, the heating-time estimating unit 14 in the fault management server 9 performs the following processing. For example, based on the temperature environment file 19 and the power W to be consumed by the CPU 3 in the heating program 15, the heating-time estimating unit 14 determines the estimated heating time t1 taken until the temperature of the CPU 3 on which the heating program 15 is executed reaches the temperature when the fault occurred (S5).

The heating-time estimating unit 14 reports the determined estimated heating time t1 to the reproduction-test submission unit 17 (S6).

The fault management server 9 reports the reproduction execution time t2 of the fault reproducing program 16 to the reproduction-test submission unit 17 (S7).

Based on the reported estimated heating time t1 and reproduction execution time t2 of the fault reproducing program 16, the reproduction-test submission unit 17 determines an execution time (="estimated heating time t1"+"execution time t2") of a reproduction test (S8).

The reproduction-test submission unit 17 makes a submission reservation of the determined execution time of the reproduction test with the job scheduler (S9). The reproduction-test submission unit 17 generates a fault-reproduction checking program by packaging the heating program that runs on the CPU 3 with the power W consumed for the estimated heating time t1 and the fault reproducing program that runs for the reproduction execution time t2, and transfers the generated fault-reproduction checking program to the SVP 8 or the node 2.

The test executing unit 18 launches the transferred fault-reproduction checking program on the SVP 8 to control execution of a fault reproduction test in the node 2 to be tested.

Figure 7A:
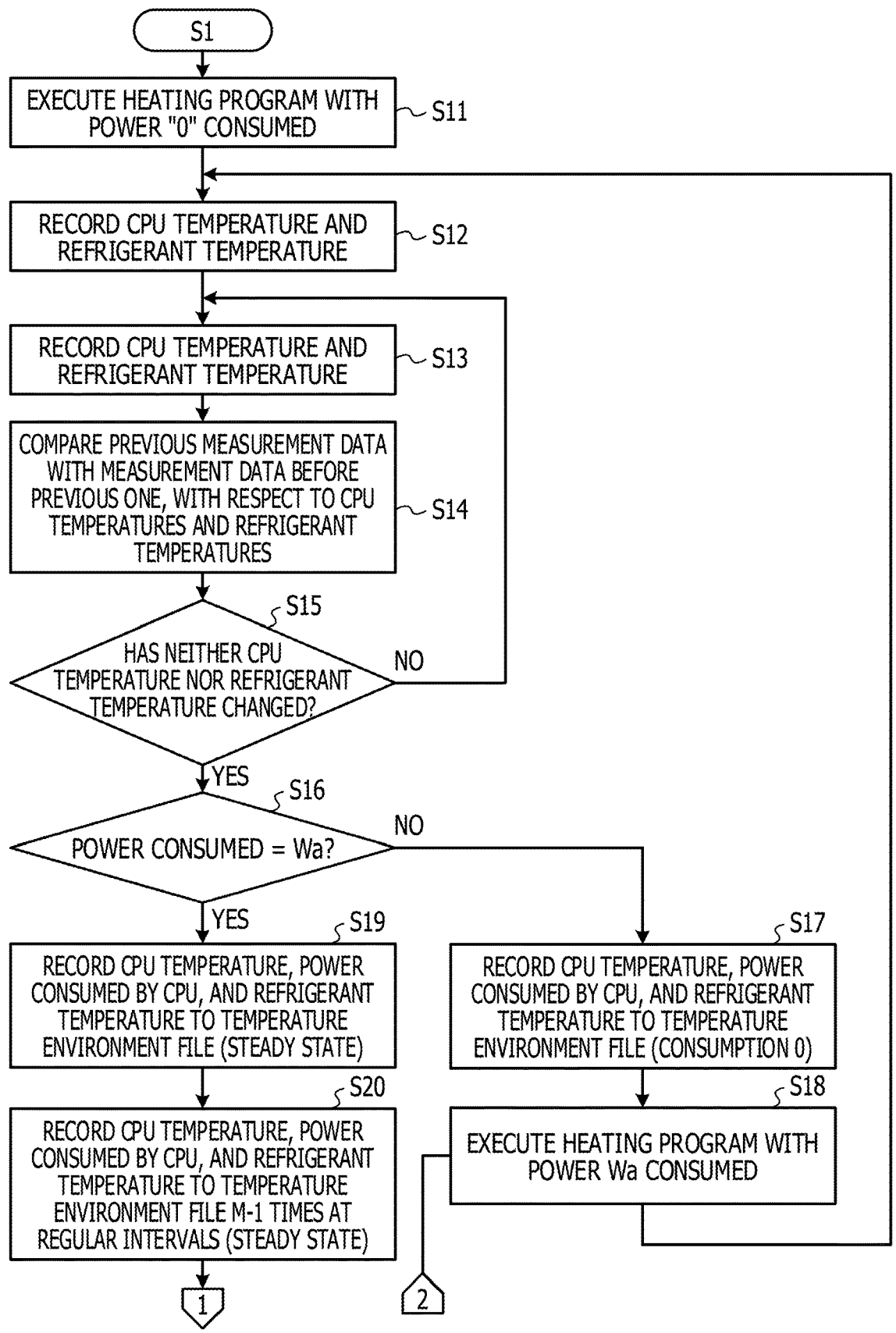
FIGS. 7A and 7B illustrate an example of processing performed by the measurement-value collection job.
Figure 7B:
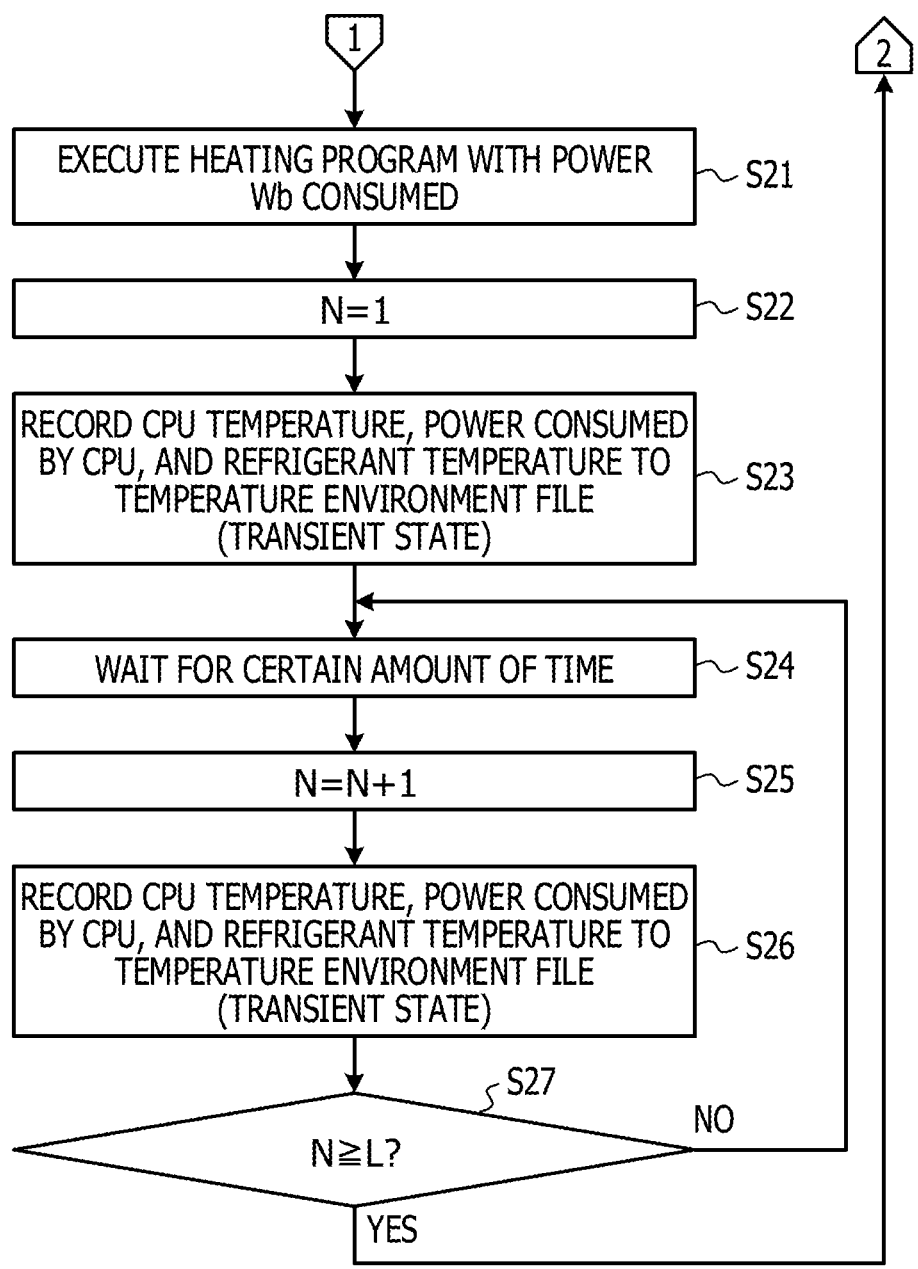

FIGS. 7A and 7B illustrate an example of processing performed by the measurement-value collection job. The measurement-value collection job 12 runs on the CPU 3 that is not occupied. As described above, the measurement-value collection job 12 includes the heating program. The measurement-value collection job 12 causes the CPU 3 that is unoccupied to execute the heating program with various powers consumed (0, Wa, Wb, Wc, . . . , where Wa, Wb, and Wc are all arbitrary real numbers) and records CPU temperatures and refrigerant temperatures with the powers consumed by the CPU 3 in the steady state and the transient state.

The measurement-value collection job 12 executes the heating program with power "0" consumed (S11). The measurement-value collection job 12 records a CPU temperature and a refrigerant temperature (S12). the measurement-value collection job 12 records a CPU temperature and a refrigerant temperature (S13). With respect to the CPU temperatures and the refrigerant temperatures, the measurement-value collection job 12 compares the previous measurement data with the measurement data before the previous one (S14).

If a result of the comparison in S14 indicates that any of the CPU temperature and the refrigerant temperature has changed ("NO" in S15), the process in S13 is performed. If the result of the comparison in S14 indicates that neither the CPU temperature nor the refrigerant temperature has changed ("YES" in S15), the measurement-value collection job 12 determines whether or not the power consumed in the heating program that is being executed is Wa (S16).

If the power consumed in the heating program that is being executed is not Wa ("NO" in S16), the measurement-value collection job 12 records the CPU temperature, the power consumed by the CPU 3, and the refrigerant temperature to the temperature environment file 19 (S17). In this case, if the power consumed in the heating program that is being executed is 0, the measurement-value collection job 12 records "consumption 0" to the "state" 19-2 in the record recorded to the temperature environment file 19 in S17. The measurement-value collection job 12 executes the heating program with power Wa consumed (S18). Thereafter, the process returns to the process in S12.

If the power consumed in the heating program that is being executed is Wa ("YES" in S16), the measurement-value collection job 12 records the CPU temperature, the power consumed by the CPU 3, and the refrigerant temperature to the temperature environment file 19 (S19). The measurement-value collection job 12 records "steady" to the "state" 19-2 in the record recorded to the temperature environment file 19 in S17.

The measurement-value collection job 12 records the CPU temperature, the power consumed by the CPU 3, and the refrigerant temperature to the temperature environment file 19 M−1 times at regular intervals (S20) and also records "steady" to the "state" 19-2 in the recorded record, where M indicates the number of times the various measurement values in the steady state are measured. In the case in FIG. 5, M is 3.

The measurement-value collection job 12 executes the heating program with power Wb consumed (S21). The measurement-value collection job 12 initializes a counter N (N is an integer-type variable) to 1 (S22). N indicates a counter variable used for measuring the number of records recorded to the temperature environment file 19 during a transient time.

The measurement-value collection job 12 records the CPU temperature, the power consumed by the CPU 3, and the refrigerant temperature to the temperature environment file 19 (S23). The measurement-value collection job 12 records "transient" to the "state" 19-2 in the record recorded to the temperature environment file 19 in S23.

The measurement-value collection job 12 waits for a certain amount of time (S24) and increments N (S25). The measurement-value collection job 12 records the CPU temperature, the power consumed by the CPU 3, and the refrigerant temperature to the temperature environment file 19 (S26). The measurement-value collection job 12 records "transient" to the "state" 19-2 in the record recorded to the temperature environment file 19 in S23.

The measurement-value collection job 12 determines whether or not N is larger than or equal to L (S27), where L is a pre-set threshold for the number of times the measurement values in the transient state are measured. In the case in FIG. 5, L is 3. For N<L ("NO" in S27), the measurement-value collection job 12 performs the process in S24. For N≥L ("YES" in S27), the measurement-value collection job 12 performs the process in S18. In this case, in S18, Wa is read instead as Wc, and Wc indicates power consumed by the CPU 3 and having a value different from Wa. In this case, in S16, Wa is also read instead as Wc.

Figure 8:
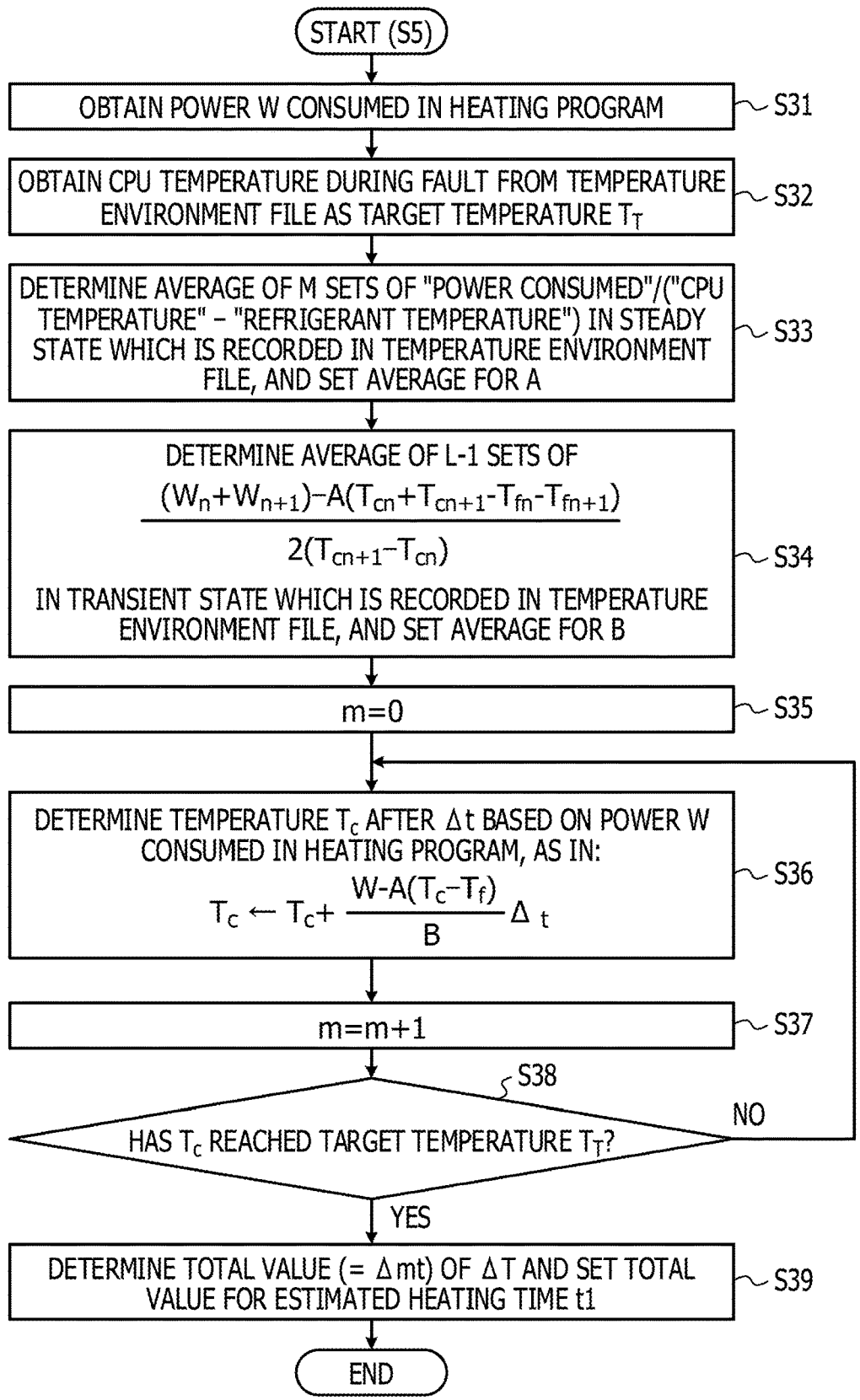
FIG. 8 illustrates an example of processing executed by a heating-time estimating unit.

FIG. 8 illustrates an example of processing executed by the heating-time estimating unit. The heating-time estimating unit 14 determines a heating time taken to reproduce a temperature when a fault occurred. The heating-time estimating unit 14 determines parameters A and B of a cooling capability, in accordance with a relationship of the power W consumed by the CPU 3, a CPU temperature $T_c$, a refrigerant temperature $T_f$ before the fault occurred which are recorded in the temperature environment file 19. The parameter A is a product of a thermal transmission rate h and a contact area S, and the parameter B is a value corresponding to a thermal capacity C, as described below. Suffixes n and n+1 of W, $T_c$, and $T_f$ indicate values corresponding to the item numbers illustrated in the format example of the temperature environment file 19 illustrated in FIG. 5.

The heating-time estimating unit 14 obtains the power W consumed by CPU 3 on which the heating program 15 is executed (S31). The power W consumed by CPU 3 is a pre-set power value and is externally input in advance. Although the time taken to reach a target temperature decreases as the value of the power W consumed increases, the upper limit of the power W consumed is defined by a limitation on power supplied to the parallel computing apparatus 1. In this case, the maximum value of settable power to be consumed is set as the power W consumed.

The heating-time estimating unit 14 obtains the CPU temperature during a fault from the temperature environment file 19 as a target temperature $T_T$ (S32). In the case in FIG. 5, 45° C. in the "CPU temperature" 19-3 included in the record in which the "fault" is recorded in the "state" 19-2 is obtained as the target temperature $T_T$.

The heating-time estimating unit 14 determines the parameter A of the cooling capability, based on the CPU temperature, the power consumed by the CPU 3, and the refrigerant temperature in the steady state which are recorded in the temperature environment file 19 (S33). The parameter A is determined according to an average of M sets of "Power Consumed by CPU"/("CPU Temperature"−"Refrigerant Temperature"). In the example in FIG. 5, A={20/(30−20)+20/(30−20)+20/(30−20)}/3=2 is obtained from a result of item numbers 2 to 4.

The heating-time estimating unit 14 determines the parameter B of the cooling capability, based on the powers $W_n$ and $W_{n+1}$ consumed by the CPU 3, the CPU temperatures $T_{cn}$ and $T_{cn+1}$, and the refrigerant temperatures $T_{fn}$ and $T_{fn+1}$ in the transient state which are recorded in the temperature environment file 19 and the parameter A (S34). The parameter B is determined according to an average of L−1 sets of $\{(W_n+W_{n+1})-A(T_{cn}+T_{cn+1}-T_{fn}-T_{fn+1})\}/2(T_{cn+1}-T_{cn})$. In the example illustrated in FIG. 5, B≈2.2 is obtained from a result of item numbers 5 to 8.

The heating-time estimating unit 14 initializes a counter m to 0 (S35). Based on the determined parameters A and B, the heating-time estimating unit 14 determines the estimated heating time t1. In this case, an interval of time that is defined for discretization in a differentiation equation and that is a "constant", is indicated by Δt. The heating-time estimating unit 14 determines a temperature after Δt, based on the power W consumed by the CPU 3 in the heating program 15 (S36).

Temperature $T_c$ after $\Delta t$ $e \leftarrow T_c + \{\{W-A(T_c-T_f)\}/B\}\Delta t$, where the initial value of $T_c$ is the temperature of the CPU 3 in the unoccupied node 2.

The heating-time estimating unit 14 increments the counter m (S37). The heating-time estimating unit 14 repeats the temperature determination after Δt, until the temperature $T_c$ after Δt reaches the target temperature $T_T$ ("NO" in S38). If the temperature $T_c$ after Δt reaches the target temperature $T_T$ ("YES" in S38), the heating-time estimating unit 14 determines a total value (=m×Δt) of Δt and sets the total value for the estimated heating time t1 (S39).

The parameters A and B may be determined as illustrated in FIG. 8, and a background of the calculation expression for determining the parameters A and B is described below. In accordance with Newton's law of cooling, the amount of heat Q of a CPU that is in contact with a flowing refrigerant can be given by the following equation.

$$dQ/dt = h(T_c - T_f)S \quad (1),$$

where h represents a thermal transmission rate, $T_c$ represents a CPU temperature, $T_f$ represents a refrigerant temperature, and S represents a contact area between a heating element and the refrigerant. The thermal transmission rate h, the contact area S, and a cool condition for the refrigerant temperature $T_f$ do not change with time. Thus, based on equation (1), the temperature of the CPU in the steady state, the CPU being heated by consuming certain power W, is given as $T_f+(W/hS)$. The parameter A determined in the flow illustrated in FIG. 8 has a value corresponding to the product of the thermal transmission rate h and the contact area S. For example, for h×S=A, the expression illustrated in S34 in FIG. 8 is derived from:

$$dQ/dt = A(T_c - T_f) \quad (2)$$

The parameter B has a value corresponding to the thermal capacity C. In the transient state, the CPU temperature $T_c$ and the amount of heat is given by the following relational expression.

$$dQ/dt = C(dT_c/dt) \quad (3)$$

The expression in S36 in FIG. 8 is derived from equations (2) and (3).

Although the above description has been given assuming that the CPU 3 is liquid-cooled, the CPU 3 may instead be air-cooled. The power W consumed in the heating program 15, the power W being set externally, may be made variable. When there is a limitation on power or the like owing to an external factor, the power consumed in the heating program 15 is assumed to have a maximum value within a limited range. The power W consumed in the heating program is reported to the heating-time estimating unit 14.

As described above, before and after a fault occurs in the CPU 3, the CPU temperature, the power consumed by the CPU 3, and the refrigerant temperature are stored in the fault management server 9 or a predetermined server in the parallel computing apparatus 1 as a temperature environment file having a predetermined format. The temperature environment file 19 is collected by the measurement-value collection job 12.

In the fault management server 9, the heating-time estimating unit 14 uses the temperature environment file 19 as input data and outputs, as the estimated heating time t1, a heating time that is to be taken for the heating program 15 to reproduce a temperature when a fault occurred.

A submission reservation of the reproduction test job is made with the job scheduler as a job that is to execute a fault reproducing program after the heating program 15 is executed during the estimated heating time.

At a timing that is independent for each node 2, the CPU 3 executes a reproduction test job when no other job is assigned. This makes it possible to increase the rate of detecting an identical fault without reducing the throughput of the entire system, thus improving the availability of the system through preventive maintenance. The "identical fault" in this case refers to a fault that can occur when the same sequence of execution commands is issued with the same register contents.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A processor-fault reproduction method comprising:
    acquiring, by a processor, third information including a fault occurrence temperature of the processor when a fault occurs;
    determining a heating time period which is taken to heat the processor by a heating program which heats the processor to the fault occurrence temperature from a current temperature of the processor included in first information based on second information regarding a power consumption value and a temperature of the processor before the fault occurs and a refrigerant temperature of a cooling medium to cool the processor and fourth information regarding a power consumption value of the processor during execution of the heating program;
    determining an execution time period by adding a fault reproduction time period which is taken by a fault reproducing program which reproduces a state of the processor when the fault occurs to the heating time period; and
    reporting the execution time period to a job scheduler in conjunction with a request to execute the heating program and the fault reproducing program.

2. The processor-fault reproduction method according to claim 1, wherein the job scheduler schedules, for a service processor, a job that executes the fault reproducing program after the heating program is executed based on the execution time period.

3. The processor-fault reproduction method according to claim 1, further comprising in the determining of the heating time period:

calculating a first cooling capability of the processor in a steady state of the processor according to, of the second information, the power consumption value of the processor, the temperature of the processor, and the refrigerant temperature when the power consumption value of the processor, the temperature of the processor, and the refrigerant temperature do not change;

calculating a second cooling capability of the processor in a transient state of the processor according to, of the second information, the power consumption value of the processor, the temperature of the processor, and the refrigerant temperature when the power consumption value of the processor, the refrigerant temperature, and the temperature of the processor change; and calculating the heating time period based on the first information, the fourth information, the first cooling capability and the second cooling capability.

4. The processor-fault reproduction method according to claim 1, further comprising:

adding increased temperatures of the processor relative to the current temperature of the processor at a time interval; and determining, when a temperature resulting from a addition reaches the fault occurrence temperature, the heating time period based on the time interval and a number of added temperatures.

5. The processor-fault reproduction method according to claim 1, further comprising:

acquiring, when the fault occurs, a power consumption value of the processor, and a refrigerant temperature together with the fault occurrence temperature; and storing an acquired fault occurrence temperature, an acquired power consumption value, and an acquired refrigerant temperature as the third information.

6. An information processing apparatus comprising:

a memory; and a processor coupled to the memory and configured to perform process of:

acquiring third information including a fault occurrence temperature of the processor when a fault occurs;

determining a heating time period which is taken to heat the processor by a heating program which heats the processor to the fault occurrence temperature from a current temperature of the processor included in first information based on second information regarding a power consumption value and a temperature of the processor before the fault occurs and a refrigerant temperature of a cooling medium to cool the processor and fourth information regarding a power consumption value of the processor during execution of the heating program;

determining an execution time period by adding a fault reproduction time period which is taken by a fault reproducing program which reproduces a state of the processor when the fault occurs to the heating time period; and reporting the execution time period to a job scheduler in conjunction with a request to execute the heating program and the fault reproducing program.

7. The information processing apparatus according to claim 6, wherein the job scheduler schedules, for a service processor, a job that executes the fault reproducing program after the heating program is executed based on the execution time period.

8. The information processing apparatus according to claim 6, wherein the processor in the determining of the heating time period:

calculates a first cooling capability of the processor in a steady state of the processor according to, of the second information, the power consumption value of the processor, the temperature of the processor, and the refrigerant temperature when the power consumption value of the processor, the temperature of the processor, and the refrigerant temperature do not change;

calculates a second cooling capability of the processor in a transient state of the processor according to, of the second information, the power consumption value of the processor, the temperature of the processor, and the refrigerant temperature when the power consumption value of the processor, the refrigerant temperature, and the temperature of the processor change; and calculates the heating time period based on the first information, the fourth information, the first cooling capability and the second cooling capability.

9. The information processing apparatus according to claim 6, wherein the processor:

adds increased temperatures of the processor relative to the current temperature of the processor at a time interval; and determines, when a temperature resulting from an addition reaches the fault occurrence temperature, the heating time period based on the time interval and a number of added temperatures.

10. The information processing apparatus according to claim 6, wherein the processor:

acquires, when the fault occurs, a power consumption value of the processor, and a refrigerant temperature together with the fault occurrence temperature; and stores an acquired fault occurrence temperature, an acquired power consumption value, and an acquired refrigerant temperature as the third information.

11. A non-transitory computer-readable recording medium recording an execution-time reporting program which causes a computer to perform a process, the process comprising:

acquiring, by a processor, third information including a fault occurrence temperature of the processor when a fault occurs;

determining a heating time period which is taken to heat the processor by a heating program which heats the processor to the fault occurrence temperature from a current temperature of the processor included in first information based on second information regarding a power consumption value and a temperature of the processor before the fault occurs and a refrigerant temperature of a cooling medium to cool the processor and fourth information regarding a power consumption value of the processor during execution of the heating program;

determining an execution time period by adding a fault reproduction time period which is taken by a fault reproducing program which reproduces a state of the processor when the fault occurs to the heating time period; and reporting the execution time period to a job scheduler in conjunction with a request to execute the heating program and the fault reproducing program.

12. The non-transitory computer-readable recording medium according to claim 11, wherein the job scheduler schedules, for a service processor, a job that executes the fault reproducing program after the heating program is executed based on the execution time period.

13. The non-transitory computer-readable recording medium according to claim 11, further comprising in the determining of the heating time period:
- calculating a first cooling capability of the processor in a steady state of the processor according to, of the second information, the power consumption value of the processor, the temperature of the processor, and the refrigerant temperature when the power consumption value of the processor, the temperature of the processor, and the refrigerant temperature do not change;
- calculating a second cooling capability of the processor in a transient state of the processor according to, of the second information, the power consumption value of the processor, the temperature of the processor, and the refrigerant temperature when the power consumption value of the processor, the refrigerant temperature, and the temperature of the processor change; and
- calculating the heating time period based on the first information, the fourth information, the first cooling capability and the second cooling capability.

14. The non-transitory computer-readable recording medium according to claim 11, further comprising:
- adding increased temperatures of the processor relative to the current temperature of the processor at a time interval; and
- determining, when a temperature resulting from an addition reaches the fault occurrence temperature, the heating time period based on the time interval and a number of added temperatures.

15. The non-transitory computer-readable recording medium according to claim 11, further comprising:
- collecting, when the fault occurs, a power consumption value of the processor, and a refrigerant temperature together with the fault occurrence temperature; and
- storing an acquired fault occurrence temperature, an acquired power consumption value, and an acquired refrigerant temperature as the third information.

* * * * *